Feb. 19, 1963 R. P. HEIDBRINK 3,077,810
COUPLING PIN DEVICE WITH RESILIENT PIVOTED RETAINING RING
Filed Oct. 28, 1960

INVENTOR
RAYMOND P. HEIDBRINK
By: Ben V. Zillman
ATTORNEY

United States Patent Office 3,077,810
Patented Feb. 19, 1963

3,077,810
COUPLING PIN DEVICE WITH RESILIENT
PIVOTAL RETAINING RING
Raymond P. Heidbrink, Rte. 1, Box 156, Owensville, Mo.
Filed Oct. 28, 1960, Ser. No. 65,834
1 Claim. (Cl. 85—5)

This invention relates to improvements in coupling pin devices and more especially to such devices used for detachably interlocking a pair of cooperable members together, as for instance farm implements to tractors and the like.

The most important object of my invention is to so form said coupling device that when so interlocking said cooperating members together, there will be no likelihood of accidentally becoming released and permit the members to disengage.

Another object of the invention is to have a spring ring pivotally carried by the coupling pin, and provided with its terminal ends to seat within said pin while the pin is in its locked position relative to said pair of cooperating members, said ends being yieldably compressible towards one another to disengage them from said seated position to permit swinging said spring past one of said cooperating members and withdrawal of the pin from said last-mentioned member.

Other objects of my invention are to so construct a device of the kind set forth, that will be of few parts, be relatively inexpensive to make, simple to use, that will be positive in its interlock, neat and attractive in appearance, long-lasting, and which will be otherwise satisfactory and efficient for use wherever found applicable.

In the drawings, wherein like reference characters indicate like or corresponding parts throughout the views, FIGURE 1 is a cross-sectional view through one end of a drawbar, showing the coupling device in both operative and inoperative locking position;

Figure 1:
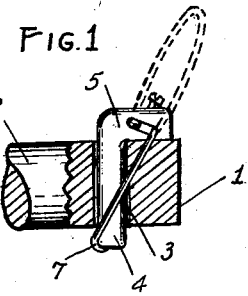

Referring more particularly to the drawings, wherein I have illustrated a preferred embodiment of my invention, 1 indicates a drawbar or the like, of a tractor or any other driver mechanism, such as is commonly used on farm machinery, and 2 indicates one of the cylindrical ends of said drawbar. Each of said ends is provided with a hole 3 that extends transversely or vertically entirely therethrough, a suitable part of a cooperating piece of machinery being adapted to be detachably connected to said drawbar in the well-known manner.

A coupling device is used for releasably interlocking said drawbar to such cooperating piece of machinery, said device comprising a substantially inverted L-shaped element that has an upright leg 4 forming a shank portion of such size and contour to easily fit through said hole 3, the other leg 5 being offset from the upper end of the shank at an angle to the latter and forming a head portion, said head provided with an elongated opening 6 that extends substantially lengthwise of the head and goes entirely through the thickness of the latter.

A split spring ring 7, made of some suitable yieldably resilient material such as of steel or the like is provided with a pair of ends 8 and 9, extends toward one another, but not in the same plane, so that when said ends are pressed together toward one another they will yieldably resist such compression and thus tend to retrieve to their original position as soon as said pressure has been released.

Figure 4:
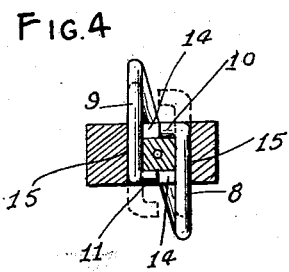
FIGURE 4 is a cross-sectional detail, taken substantially along the line 4—4 of FIG. 2, showing the spring in both its locked and unlocked positions.
Figure 3:
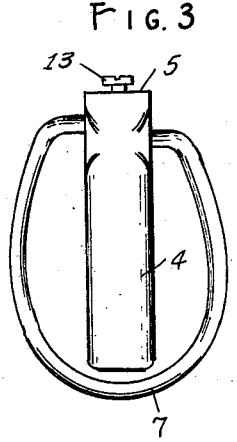
FIGURE 3 is an elevation of the same.

The tips of each of said ends of the ring are angularly offset therefrom to provide the terminals 10 and 11, respectively, extending toward one another when the ring is in its normal locking position, as seen most clearly in FIG. 4 in full lines.

Figure 5:
FIGURE 5 is a perspective detail of the spacer block.

A block element 12 of substantially the shape indicated in FIG. 5 is interposed within said opening in the head of the pin and is held in place therein by any suitable means, as for instance the screw or bolt 13, leaving just enough space between its front and rear faces and the corresponding front and rear faces of said opening to form the pair of pockets 14—14, and with enough space between the ends of said block and the corresponding end walls of said opening to provide the pair of passageways of substantially the size and shape of the spring, as indicated at 15—15, and thereby rotatably receive said ends 8 and 9 of the latter, as shown in FIG. 4.

Figure 2:
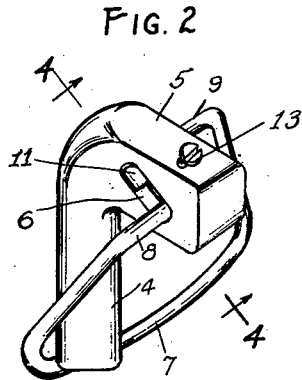
FIGURE 2 is a perspective view of the device, showing the parts in locked position.

This spring is so made that its ends normally tend to spring apart when the spring is in its locking position as indicated in FIG. 2, causing the terminals to seat entirely within said pockets 14—14 and to prevent any tendency of accidental rotational or pivotal movement of the spring relatively of said head.

It is to be noted that when said spring is in said locked position, the overall combined thickness of the spring and the pin shank is sufficiently greater than that of the diameter of the hole 3 to prevent any accidental withdrawal of the pin through said hole, as seen most clearly in FIG. 1, so here again, there is provided means to minimize any danger of the coupling becoming accidentally disengaged from its operative locking position.

Figure 6:
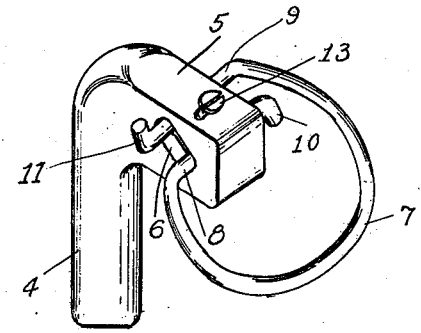
FIGURE 6 is a perspective view, showing the spring in its unlocked position.

Now, when it is desired to disengage the coupling from its interlock position, so as to perhaps replace one piece of cooperating machinery with another, or for any other reason, the ends of the spring are compressed together to bring its ends toward one another, as seen in FIGS. 4 and 6, to thereby release said terminals from the pockets, so that pivotal actuation of the spring at this stage will swing the latter to the position shown in dotted lines in FIGS. 1 and 4, and in full lines in FIG. 6, and as soon as said compressing force is released from the stage shown in FIG. 6, said terminals will retrieve themselves to clamp against the front and rear faces of the head of the pin, and permit ready withdrawal of the pin device from the hole 3.

I claim:

A pin device for detachably coupling to a member that has a hole therethrough, comprising a pin that has a shank insertible through said hole and is provided with a head that extends at an angle to the shank, said head being provided with opposed side surfaces having a pair of substantially parallel passageways therethrough offset from and extending laterally relative to the axis of said shank from one side surface of said head to the other side surface of said head, and there being a pair of elongated slots in said head, one slot lying in each side surface of said head and communicating with the ends of said passageways to form pockets within said head, and a resilient split ring, the opposite ends of said ring providing legs inserted through said passageways from opposite sides of said head, said leg ends provided with bent-over terminal portions, said terminal portions adapted to lie within said pockets, and said terminal portions having a greater length than the width of said pockets to thereby lock said ring in position and prevent accidental pivotal movement of said ring relatively of said pin, said ring in its locked position underlying the shank of said pin to thereby prevent accidental withdrawal of said pin from said member.

References Cited in the file of this patent

UNITED STATES PATENTS

| | | |
|---|---|---|
| 2,674,167 | Sawyer | Apr. 6, 1954 |
| 2,798,272 | Boots | July 9, 1957 |
| 2,923,045 | Mount | Feb. 2, 1960 |

FOREIGN PATENTS

| | | |
|---|---|---|
| 847,292 | Great Britain | Sept. 7, 1960 |